(12) United States Patent
Veraza

(10) Patent No.: US 11,821,544 B1
(45) Date of Patent: Nov. 21, 2023

(54) RECTANGULAR CONVOLUTED FLUID TUBE

(71) Applicant: COOPER-STANDARD AUTOMOTIVE INC, Northville, MI (US)

(72) Inventor: Christian A. Veraza, Auburn Hills, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/749,440

(22) Filed: May 20, 2022

(51) Int. Cl.
*F16L 11/15* (2006.01)

(52) U.S. Cl.
CPC .................... *F16L 11/15* (2013.01)

(58) Field of Classification Search
CPC .......... F16L 11/11; F16L 27/11; E04D 13/08; E04D 2013/0813
USPC ...... 138/118, 119, 121, 122, DIG. 11; 52/16, 52/226, 903
See application file for complete search history.

(56) References Cited

U.S. PATENT DOCUMENTS

| | | | | |
|---|---|---|---|---|
| 6,223,777 | B1* | 5/2001 | Smith | E04D 13/08 138/119 |
| 6,872,888 | B2* | 3/2005 | Santelli, Jr. | H02G 3/0468 138/121 |
| 7,069,953 | B2* | 7/2006 | Buttner | F16L 11/15 138/109 |
| 8,607,827 | B2 | 12/2013 | Bell et al. | |
| 2004/0007278 | A1* | 1/2004 | Williams | B29C 48/09 285/903 |
| 2005/0155660 | A1* | 7/2005 | Handley | E04D 13/08 52/16 |
| 2012/0049511 | A1* | 3/2012 | Bell | F16L 27/11 285/226 |
| 2012/0068452 | A1* | 3/2012 | Boettner | E04D 13/08 138/140 |
| 2021/0010620 | A1 | 1/2021 | Renaud | |

\* cited by examiner

*Primary Examiner* — Patrick F Brinson
(74) *Attorney, Agent, or Firm* — Paschall & Associates, LLC; James C. Paschall

(57) ABSTRACT

A rectangular tube is disclosed comprising a rectangular convoluted section that includes a wall that defines a series of peaks alternating with a series of valleys and that provides a periphery of opposing rectangular base sides and opposing rectangular height sides. A continuous rectangular section extends from one end of the rectangular convoluted section and a transition section extends from another end of rectangular convoluted section.

18 Claims, 2 Drawing Sheets

RECTANGULAR CONVOLUTED FLUID TUBE

TECHNICAL FIELD

This disclosure is generally directed to tubes that transport fluid. More specifically, it relates to a rectangular fluid tube with a convoluted section.

BACKGROUND

Tubing systems that direct a fluid from one location to another are particularly important for electric vehicles (EV) for cooling the EV battery that powers the vehicle. However, in such vehicular applications space requirements becomes an important consideration. The components of an EV thermal management systems such as for example pumps, actuators, chillers, etc. are interconnected by a large amount of tubing that is used to convey coolant fluid from one component of the EV to the next. Severe restriction on space in such tubing systems is an important consideration in the design and installation of such tubing systems since space within and along the EV chassis is quite narrow, and irregular. Coolant tubes having round cross-sectional shapes require a large internal diameters to convey adequate fluid. Packaging round tubes in bundles of premanufactured assemblies is particularly problematic due to the large space requirement and weight of the round tubes. Additionally, pressure drops within the thermal management systems due to the use of round tubes typically consumes higher power from the EV battery to power the pump of the thermal management system.

Convoluted sections have long been used on tubes in various vehicular applications such as for engine air intake ducts or metal exhaust pipes. They provide for fitting complex tube lines in confined and irregular spaces and compensating for assembly tolerances of the connected parts and any movement induced by in-service stress.

Therefore, for reasons of design, layout and weight, EV vehicle manufactures have been searching for an optimized solution for tubing systems that can be used in the narrow and irregular spaces of an EV vehicle and that can reduce the power requirements used to convey coolant fluid in a thermal management system.

SUMMARY

This disclosure relates to a rectangular fluid tube with a convoluted section.

In a first embodiment, a rectangular tube is disclosed comprising a rectangular convoluted section having a wall that defines a series of peaks alternating with a series of valleys that provide a periphery of opposing rectangular base sides and opposing rectangular height sides. A continuous rectangular section extends from one end of the rectangular convoluted section and a transition section extends from another end of rectangular convoluted section.

In a second embodiment a convoluted tube is disclosed comprising a tube including a rectangular convoluted section. The rectangular convoluted section comprising a wall that defines a series of peaks alternating with a series of valleys; and a series of round crests located in the valleys between adjacent peaks.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
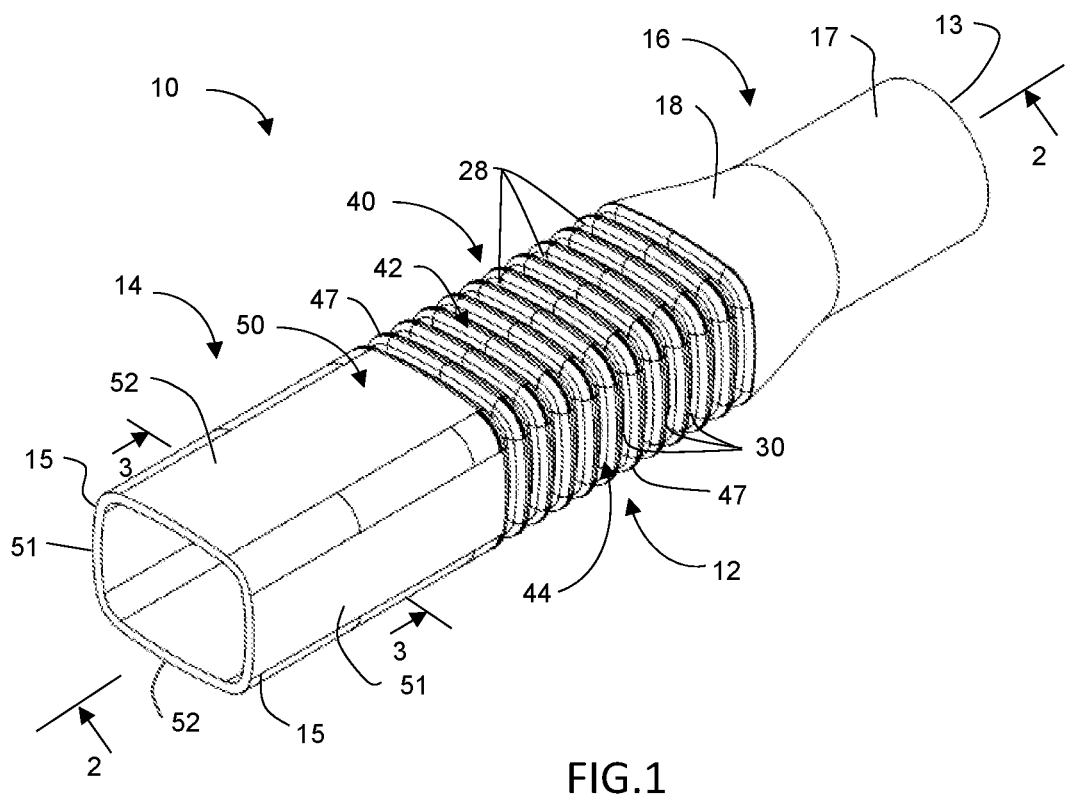
FIG. 1 is an isometric view of the rectangular tube according to the present disclosure.

The present disclosure relates to a tube 10 for conveying pressurized or unpressurized fluids. As shown in FIG. 1, the tube 10 comprises a continuous rectangular section 14, a flexible convoluted section 12, and a transition section 16. The tube may be used to particular advantage, though not exclusively, in coolant circuits, as part of the cooling system of a vehicle powered by an electric battery or a vehicle using an internal combustion engine. Both the rectangular section 14 and transitional section 16 may be unitarily joined with the convoluted section 12. The transition section 16 includes a cylindrical portion 17 and a frustoconical portion 18. The frustoconical portion 18 transitions between the convoluted section 12 and the cylindrical portion 17. The cylindrical portion is arranged to receive and accept a fluid connector or fitting into an opening 13.

The outer periphery 50 of the continuous rectangular section 14 is generally a rectangular shape that includes a first pair of radiused sides 52 defining the rectangular base of the rectangular section 14 and a second pair of adjacent radiused sides 51 defining the rectangular height of the rectangular section 14. The pair of radiused sides 52 and 51 extending between rounded corners 15. The continuous rectangular section 14 may be extruded in different continuous lengths. A second transition section (not shown) may have a frustoconical portion unitarily joined to an end of the continuous rectangular section 14. The cylindrical portion of a second transition section arranged to receive another fluid connector or a connection to a fluid fitting of a coolant circuit component. The tube 10 may also be configured to include multiple convoluted sections 12 unitarily connected between multiple continuous rectangular sections 14 to provide multiple convoluted sections 12 arranged to provide the flexibility to negotiate around a plurality of irregular spaces.

The tube 10 may be extruded from a thermoplastic material such as for example polypropylene or may be extruded using a co-extrusion process from two more layers of material bonded together by an adhesive. For example, the tube 10 may be extruded having an outer layer of a polyamide material such as for example a PA612 nylon and an inner layer of a high impact polypropylene copolymer bonded together using a suitable adhesive.

The convoluted section 12 is generally rectangular in cross-section that matches the outer periphery 50 of the continuous rectangular section 14. The convoluted section 12 is comprised of a series of peaks 28 alternating with a series of valleys 30. The peaks 28 and the valleys 30 surround the tube 10 at the convoluted section 12. The peaks 28 and the valleys 30 run parallel to each other about convoluted section 12 of the tube 10. Peaks 28 in the convoluted section 12 provide an outer periphery 40. The outer periphery 40 includes a first pair of radiused opposing sides 42 defining the rectangular base of the convoluted section 12 and a second pair of opposing radiused sides 44 defining the rectangular height of the convoluted section 12. The first and second pairs of radiused sides 42 and 44 extending between rounded corners 47.

Figure 2:
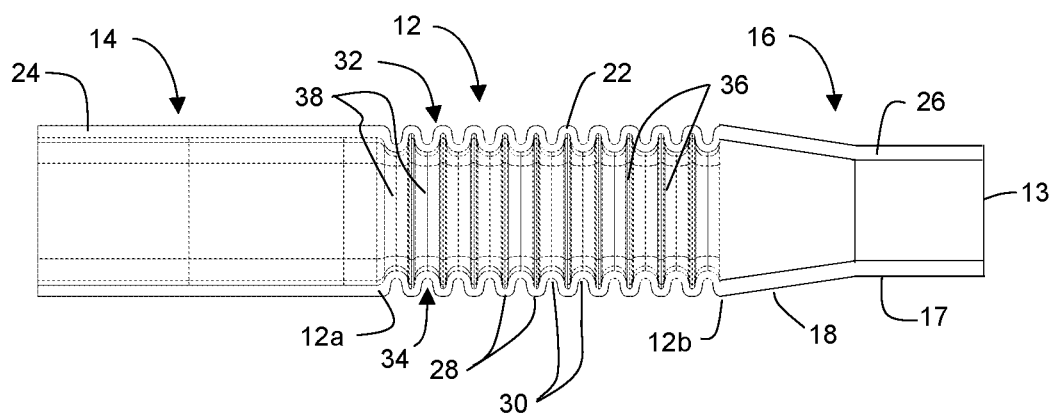
FIG. 2 is a sectional view through the tube taken along line 2-2 in FIG. 1 according to the present disclosure.

FIG. 2 is a sectional view taken along segment 2-2 of the tube 10 in FIG. 1. The convoluted section 12 includes a wall 22 that is shown joined to wall 24 of the continuous rectangular section 14 on one end 12a and joined to a wall 26 of the transition section 16 on the other end at 12b at the frustoconical portion 18. The peaks 28 in the wall 22 are rounded and the valleys 30 in the wall 22 are also rounded. The peaks 28 define the outer periphery 40 around the tube 10. The peaks 28 have a profile 32 that is generally uniform around the outer periphery 40 of the tube 10 in the convoluted section 12, and the valleys 30 also have a profile 34 that is generally uniform around the periphery 40 of the tube 10. Sides 36 of the peaks 28 are generally parallel to sides 38 of the valleys 30 all around the convoluted section 12. The wall 22 is advantageously of a generally uniform thickness in the peaks 28 and in the valleys 30.

Figure 3:
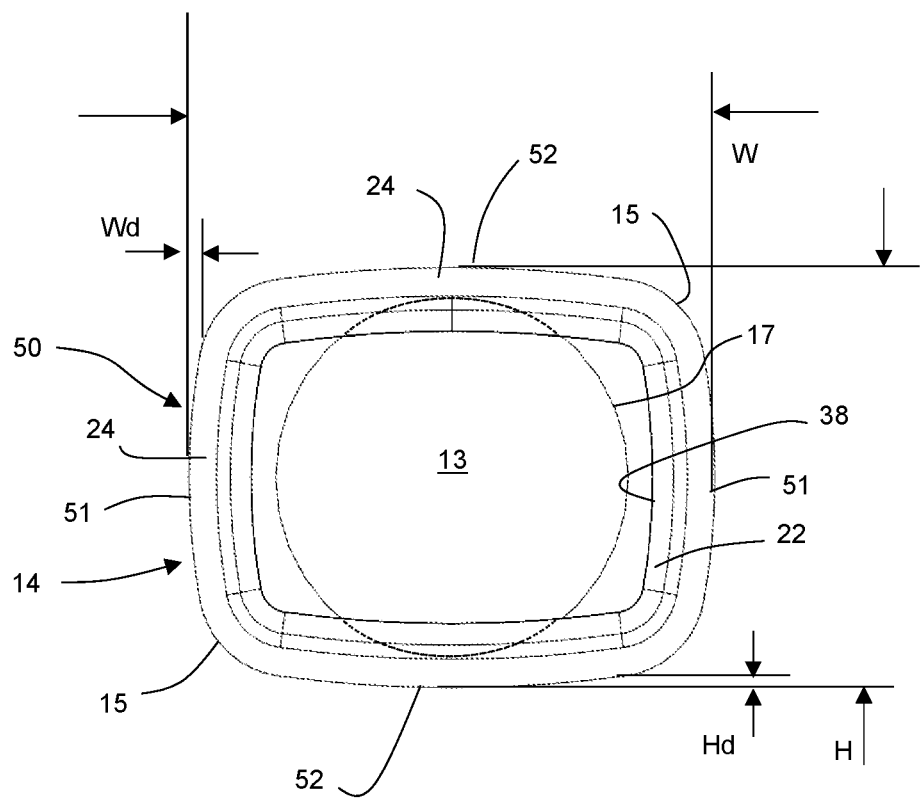
FIG. 3 is a sectional view taken along segment 3-3 in FIG. 1 according to the present disclosure.

FIG. 3 is a sectional view taken along segment 3-3 through continuous rectangular section 14 of the tube 10 in FIG. 1. The continuous rectangular section 14 provides an outer periphery 50 comprising a first pair of opposing radiused sides 52 corresponding to the geometric base sides of a rectangle. A second pair of opposing radiused sides 51 are located adjacent the first pair of radiused sides 52. The second pair of radiused sides 51 corresponding to the geometric height sides of a rectangle. The first pair of radiused sides 52 extend from corresponding second pair of radiused sides 51 from respective rounded corners 15. The periphery 50 of rectangular section 50 has a width W and a height H. As seen in FIG. 3, the width W is greater than the height H. Additionally, the center portion of both sides 52 are radiused inward toward the rounded corners 15 for a distance Wd. Similarly, the center portion of both sides 51 are radiused inward toward the rounded corners 15 for a distance of Hd.

Referring back to FIGS. 1 and 2, the peaks 28 in the convoluted section 12 define an outer diameter of the periphery 40 that is no greater than the corresponding outer diameter of periphery 50 of the continuous rectangular section 14 adjacent to the convoluted section 12 and the outer diameter of the frustoconical portion 18 where it transitions at end 12b at all radial points around the periphery 40. For example, the diameter of the first pair of sides 42 of the periphery 40 of the convoluted section 12 are substantially the same diameter as the first pair of sides 52 of the continuous rectangular section 14. Moreover, the diameter of the second pair of sides 44 of the periphery 40 of the convoluted section 12 are no greater in diameter than the second pair of sides 51 of the continuous rectangular section 14 periphery 50. The outer periphery of the frustoconical portion 18 at 12b is the same diameter as the periphery 40 of convoluted section 12. The frustoconical portion 18 tapering down to the diameter of the cylindrical portion 17.

Figure 4:
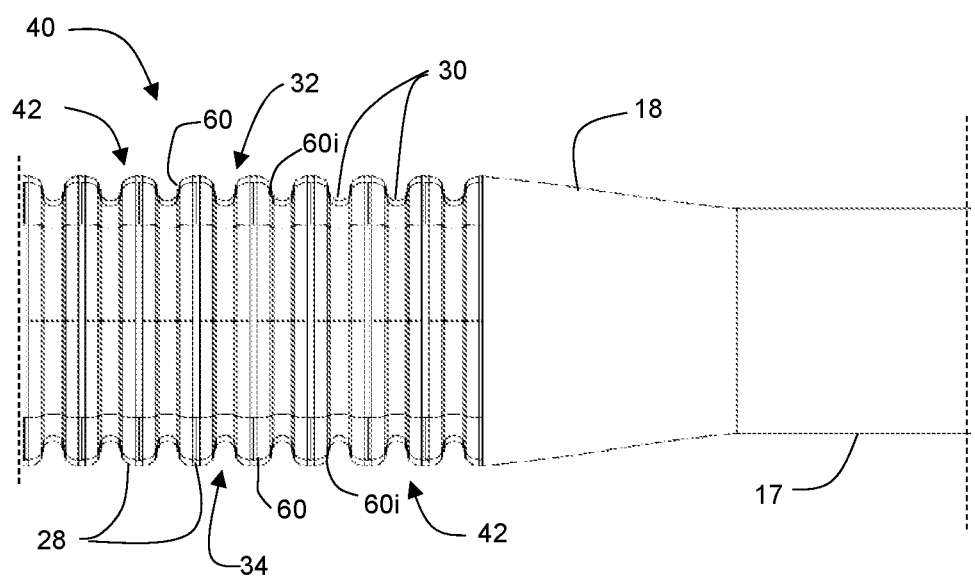
FIG. 4 is a partial elevational view of the convoluted section and transition section of the rectangular tube according to the present invention.

Turning to FIG. 4, the uniformity of the profile 32 of the 28 peaks and the profile 34 of the valleys 32 is interrupted on the radiused sides 42 by a series of crests 60 located in the valleys 30 between adjacent peaks 28 among the radiused sides 42. The crests 60 may have a radially rounded surface. The crests 60 alternatingly fill the valleys 32 in the series of valleys and merge with each peak 28 in the series of peaks. Each crest 60 may define a chord of a cylinder about a longitudinal axis that merges with the adjacent peaks 28 on each axial side of the crest. The crests 60 are located only in the convoluted section 12 and do not extend beyond the convoluted section of the tube 10. The crests can be seen on the radiused sides 42 filling a part of the valleys 30 and merging with sides 36 of the peaks 28.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A rectangular tube comprising:
   a rectangular convoluted section, the rectangular convoluted section comprising a wall that defines a series of peaks alternating with a series of valleys that provide a periphery of opposing rectangular base sides and opposing rectangular height sides; and
   a continuous rectangular section extending from one end of the rectangular convoluted section, having a periphery of opposing rectangular base sides and opposing rectangular height sides that have an outer diameter equal to the corresponding periphery of opposing rectangular base sides and opposing rectangular height sides of the rectangular convoluted section.

2. The tube of claim 1, wherein the rectangular tube further comprises a transition section extending from another end of the rectangular convoluted section.

3. The tube of claim 1, wherein the peaks have a uniform profile around the periphery of the convoluted section.

4. The tube of claim 1, wherein the peaks and the valleys surround the convoluted section.

5. The tube of claim 2, wherein another transition section extends from another end of the continuous rectangular section opposite from the rectangular convoluted section.

6. The tube of claim 2, wherein the transition section includes a cylindrical portion having an opening on one end of the cylindrical portion and a frustoconical portion extending from an opposite end of the cylindrical portion.

7. The tube of claim 6, wherein the outer diameter of the frustoconical portion has a diameter that is no greater than the corresponding outer diameter of the convoluted section periphery where the frustoconical portion extends from the convoluted section.

8. The tube of claim 6, wherein the outer diameter of the frustoconical portion has a diameter that is no greater than the corresponding outer diameter of the continuous rectangular section periphery where the frustoconical portion extends from the rectangular section.

9. A convoluted tube comprising:
a tube having a rectangular convoluted section, the rectangular convoluted section comprising a wall that defines a series of peaks alternating with a series of valleys;
a series of round crests located in the valleys between adjacent peaks; and
a continuous rectangular section extending from an end of the rectangular convoluted section and having an outer diameter that is equal to an outer diameter formed by the peaks of the rectangular convoluted section.

10. The convoluted tube of claim 9, further comprising radially round crests.

11. The convoluted tube of claim 10, wherein the radially round crests define a chord of a cylinder that merges with the series of peaks.

12. The convoluted tube of claim 9, wherein the peaks have a uniform profile at all points in a periphery around the tube.

13. The convoluted tube of claim 9, further comprising peaks that surround the tube.

14. The convoluted tube of claim 9, further comprising an outer diameter of the crests that is greater than an outer diameter of the valleys.

15. The convoluted tube of claim 9, further comprising rounded peaks and rounded valleys.

16. The convoluted tube of claim 9, wherein the series of round crests do not extend beyond the convoluted section of the tube.

17. The convoluted tube of claim 9, wherein the convoluted section provides a periphery comprising a rectangular base sides and a rectangular height side.

18. The convoluted tube of claim 17, wherein the periphery further comprises opposing rectangular base sides and opposing rectangular height sides.

* * * * *